(12) United States Patent
Brown

(10) Patent No.: US 7,090,168 B1
(45) Date of Patent: Aug. 15, 2006

(54) CATENARY GIRT ARRANGEMENT FOR EMERGENCY EVACUATION SLIDES

(75) Inventor: Frank J. Brown, Bayville, NJ (US)

(73) Assignee: Air Cruisers Company, Wall, NJ (US)

( * ) Notice: Subject to any disclaimer, the term of this patent is extended or adjusted under 35 U.S.C. 154(b) by 0 days.

(21) Appl. No.: 11/130,372

(22) Filed: May 16, 2005

(51) Int. Cl.
*B64C 1/22* (2006.01)

(52) U.S. Cl. .................. 244/137.2; 244/905; 193/25 B; 182/48

(58) Field of Classification Search ................ 244/905, 244/137.2, 129.1; 193/25 B; 182/48
See application file for complete search history.

(56) References Cited

U.S. PATENT DOCUMENTS

| 3,634,914 | A | | 1/1972 | Schroedter |
| 3,852,854 | A | | 12/1974 | Sigrud et al. |
| 4,526,262 | A | * | 7/1985 | Malcolm .................. 193/25 B |
| 5,106,036 | A | | 4/1992 | Sepstrup |
| 5,400,985 | A | | 3/1995 | Banks |
| 5,542,628 | A | * | 8/1996 | Nishimura et al. ...... 244/137.2 |
| 5,875,868 | A | | 3/1999 | Smialowicz et al. |
| 5,906,340 | A | | 5/1999 | Duggal |
| 5,975,467 | A | | 11/1999 | O'Donnell et al. |
| 6,199,676 | B1 | | 3/2001 | Targiroff |
| 6,298,970 | B1 | | 10/2001 | Targiroff |
| 6,641,445 | B1 | | 11/2003 | Jurlina et al. |
| 6,644,596 | B1 | | 11/2003 | Jurlina et al. |
| 6,769,647 | B1 | * | 8/2004 | Moro et al. ............... 244/137.2 |
| 6,814,183 | B1 | * | 11/2004 | Horvath et al. ................ 182/48 |
| 6,959,658 | B1 | * | 11/2005 | Gronlund et al. ...... 112/475.01 |

* cited by examiner

*Primary Examiner*—J. Woodrow Eldred
(74) *Attorney, Agent, or Firm*—Lawrence G. Fridman

(57) ABSTRACT

A girt assembly for releasably connecting an evacuation slide to an aircraft includes superimposed flexible panels that are continuous at a pair of spaced connection points for connection with the aircraft. One or more catenary loops are formed in each panel for distributing forces on the flexible panels along a length of the loops. The connection points may be releasably connected to a girt bar with spaced bracket assemblies or directly connected to floor brackets associated with the aircraft.

25 Claims, 8 Drawing Sheets

CATENARY GIRT ARRANGEMENT FOR EMERGENCY EVACUATION SLIDES

FIELD OF THE INVENTION

The present invention relates generally to escape slides for aircraft or the like, and more particularly to a girt arrangement for selectively holding and releasing the escape slide with respect to the aircraft.

BACKGROUND OF THE INVENTION

In the event of an emergency situation aboard a large commercial passenger airplane where evacuation of the passengers and crew becomes necessary, emergency escape slides are typically used. These escape slides are typically stored inside the passenger doors of the airplane. Prior to normal operations for embarking and disembarking passengers at the airport terminal gate, the emergency escape slides are disarmed. This allows the cabin doors to be opened and closed in a normal manner without activating the emergency escape slides.

However, once the airplane leaves the airport terminal gate, the emergency escape slides are armed. Arming the emergency escape slides causes a metal girt bar attached to the girt at the upper end of each slide to be connected to the floor of the airplane cabin. In the event of a situation requiring emergency evacuation of the passengers and crew from the airplane, each emergency escape slide is deployed by moving the door handle connected to the inside of the cabin door to the open position to thereby open the door, causing the uninflated escape slide to fall from its storage pack inside the cabin and inflate outside the airplane. Since the upper end of the inflating escape slide is attached to the girt bar, the escape slide remains connected to the airplane.

During inflation, the escape slide has a tendency to pop open thereby resulting in a significant force being applied to both the girt and the girt bar. Once the slide is inflated, the weight of passengers, crew, equipment, and so on can also create significant loads on both the girt and girt bar.

As shown in FIG. 1, a typical prior art solution includes an escape slide 10 releasable connected to the fuselage 12 (shown in phantom line) of an aircraft by a girt 14 that extends from the doorway (not shown) of the aircraft, wraps around a first sill tube 16, and is cemented, sewn or otherwise connected at one end to the floor 18 of the escape slide. An opposite end (not shown) of the girt 14 is wrapped around a girt bar (not shown) along the entire length thereof. The girt bar is in turn connected to the floor of the aircraft when the escape slide 10 is armed or deployed. Such an arrangement creates an interface between the inflatable slide and the respective aircraft. The loads from slide deployment, passenger egress, wind, and/or water are transmitted through the fabric of the girt into the girt bar and consequently into the floor fittings of the aircraft.

One drawback of such a prior art solution is that when an inflatable slide is loaded, a uniform load is applied across the length of the girt bar which is suspended at its opposite ends. This arrangement results in a substantial bending moment at the center of the bar. Consequently, the girt bar tends to flex and, if inadequately designed, could lead to catastrophic failure. Accordingly, the strength of the material as well as the cross-sectional area and shape of the prior art girt bar must be taken into account during the design process and is typically based on the maximum load generated during sliding tests plus a predefined safety factor. As a consequence, heavy girt bars capable of withstanding such loads are typically required in the prior art evacuation arrangements.

In addition, prior art girts may experience point sources of loading, causing tearing of the fabric and consequent failure. Also, in the event of a water landing, some prior art solutions require release of the entire girt bar itself from the aircraft in order to release the inflated evacuation slide, while other prior art solutions employ a complicated two-piece girt with a series of loops and webbing arranged in a daisy chain that extends across the entire girt bar for release therefrom. Such a solution is complicated to construct, difficult to maintain and awkward to deploy, especially in emergency situations where time is of the essence.

BRIEF SUMMARY OF THE INVENTION

According to one aspect of the invention, a girt assembly for releasably connecting an evacuation slide to an aircraft is provided. The girt assembly comprises a first flexible panel having a pair of spaced connection points for connection with the aircraft and a first connection area spaced from the connection points for connection with the evacuation slide. A first loop extends into the first flexible panel from the connection points. In this manner, forces on the first flexible panel are distributed along a length of the first loop. Preferably, the first loop is of a catenary shape.

According to a further aspect of the invention, a girt bar is provided with spaced bracket assemblies for releasably holding the spaced connection points. Each bracket assembly may include a pivotal locking lever movable between an open position for releasing one of the connection points and a closed position for holding the one connection point, and a release pin extending through the locking lever for selectively holding the locking lever in the closed position.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings may not necessarily be to scale. The invention will now be described in greater detail with reference to the accompanying drawings.

DETAILED DESCRIPTION OF THE INVENTION

Figure 1:
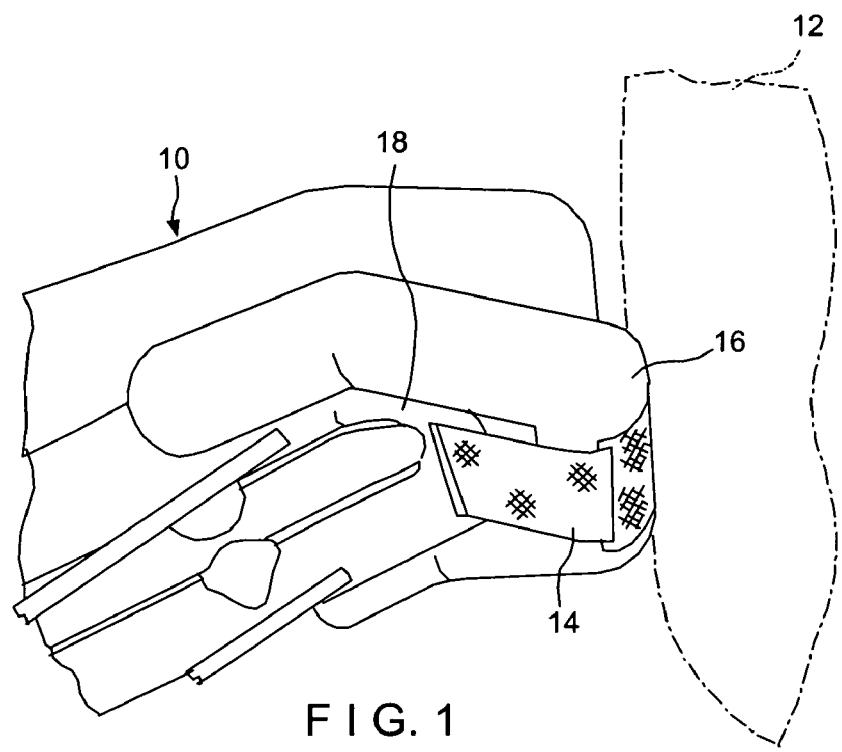
FIG. 1 is a bottom perspective view of a portion of an evacuation slide connected to the fuselage of an airplane through a prior art girt arrangement.
Figure 2:
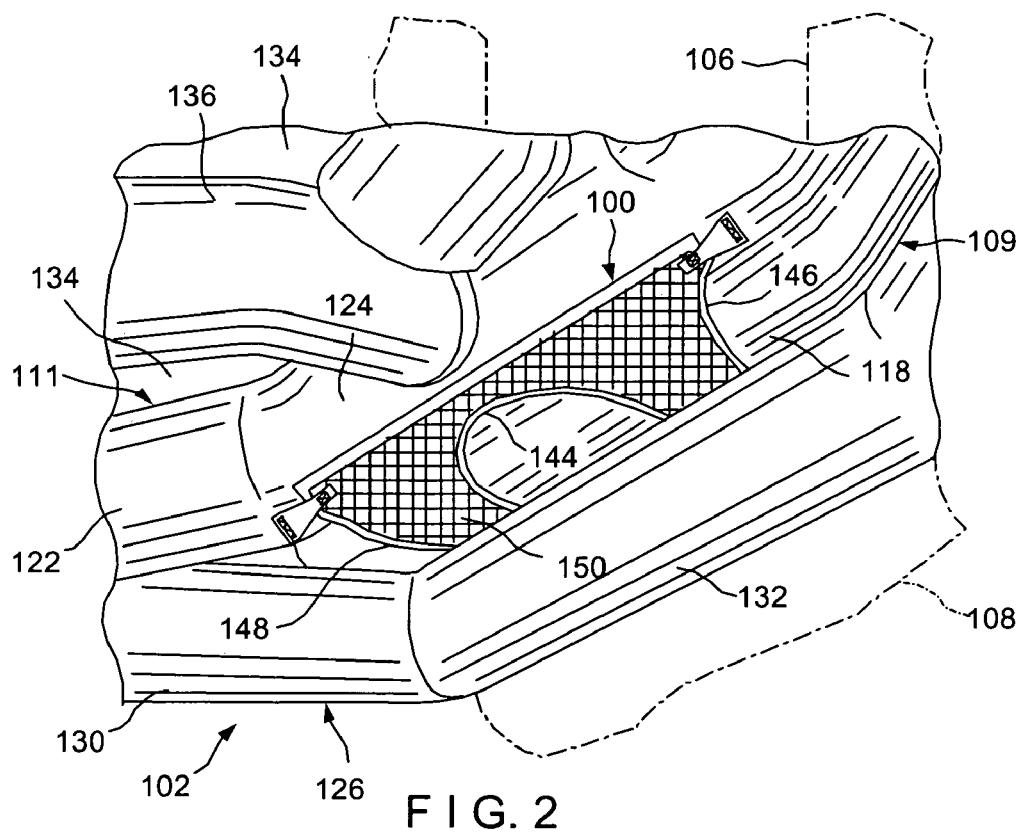
FIG. 2 is a bottom perspective view of a portion of an evacuation slide connected to the fuselage of an airplane through a girt assembly in accordance with the present invention.
Figure 3:
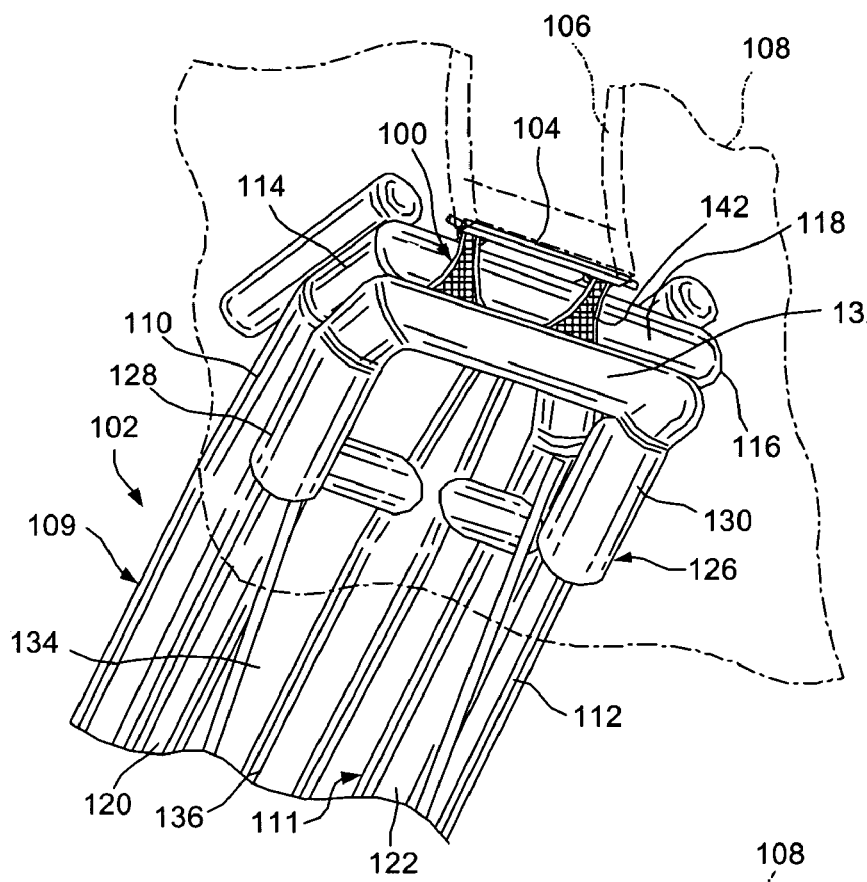
FIG. 3 is a bottom perspective view similar to FIG. 2 as seen from the airplane fuselage.
Figure 4:
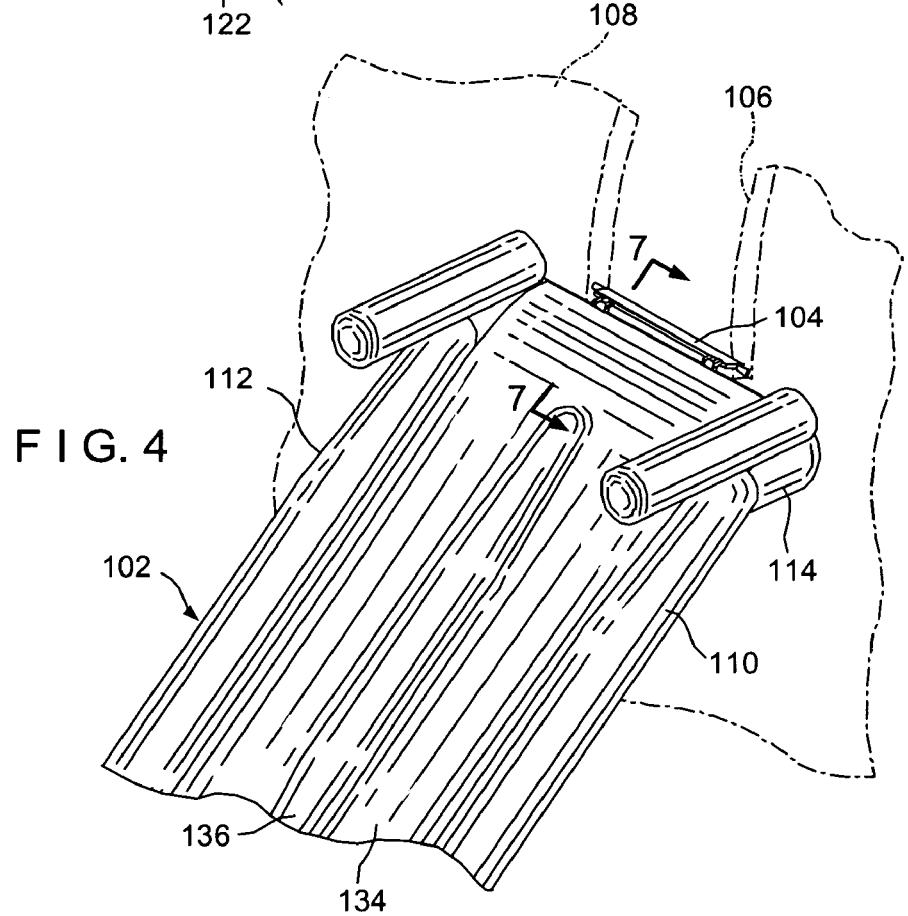
FIG. 4 is a top perspective view of the evacuation slide and girt assembly in accordance with the present invention.

Referring to the drawings, and to FIGS. 2 and 3 in particular, a catenary girt assembly 100 in accordance with the present invention is preferably permanently connected to an inflatable evacuation slide 102 and may be releasably connectable to a girt bar 104 that is in turn preferably mounted in a doorway 106 (shown in phantom line) of an aircraft fuselage 108 (also shown in phantom line). Although only a single doorway 106 is shown, the catenary girt assembly 100 can be associated with any doorway, escape hatch or compartment of the aircraft that is equipped with an evacuation slide, including wing-mounted slides.

The inflatable evacuation slide 102 may be of conventional construction and, as shown, includes an outer inflatable frame 109 and an inner inflatable frame 111 connected to the outer inflatable frame. The outer inflatable frame 109 has a pair of spaced, generally longitudinally extending side tubes 110 and 112 interconnected at their upper end portions 114 and 116, respectively, by a laterally extending end tube 118. Likewise, the inner inflatable frame 111 has a pair of spaced, generally longitudinally extending side tubes 120 and 122 interconnected at their upper ends by a laterally extending end tube 124. A lower inflatable support frame 126 is connected to the outer inflatable frame 109 and includes a pair of spaced side tubes 128, 130 and an end tube 132 extending between the side tubes 128, 130. A floor 134 constructed of flexible material extends across the outer inflatable frame 109. An inflatable support tube 136 is located between the side tubes 110 and 112 of the outer inflatable frame to support and divide the floor 134 into separate escape channels for passengers exiting the aircraft fuselage 108 during emergency evacuation. The inflatable evacuation slide can be released from the fuselage and used as a life raft in the event of a water landing, as will be described in greater detail below. It will be understood that the inflatable evacuation slide is illustrative only and that the girt assembly of the present invention can be used with any slide construction.

Figure 5:
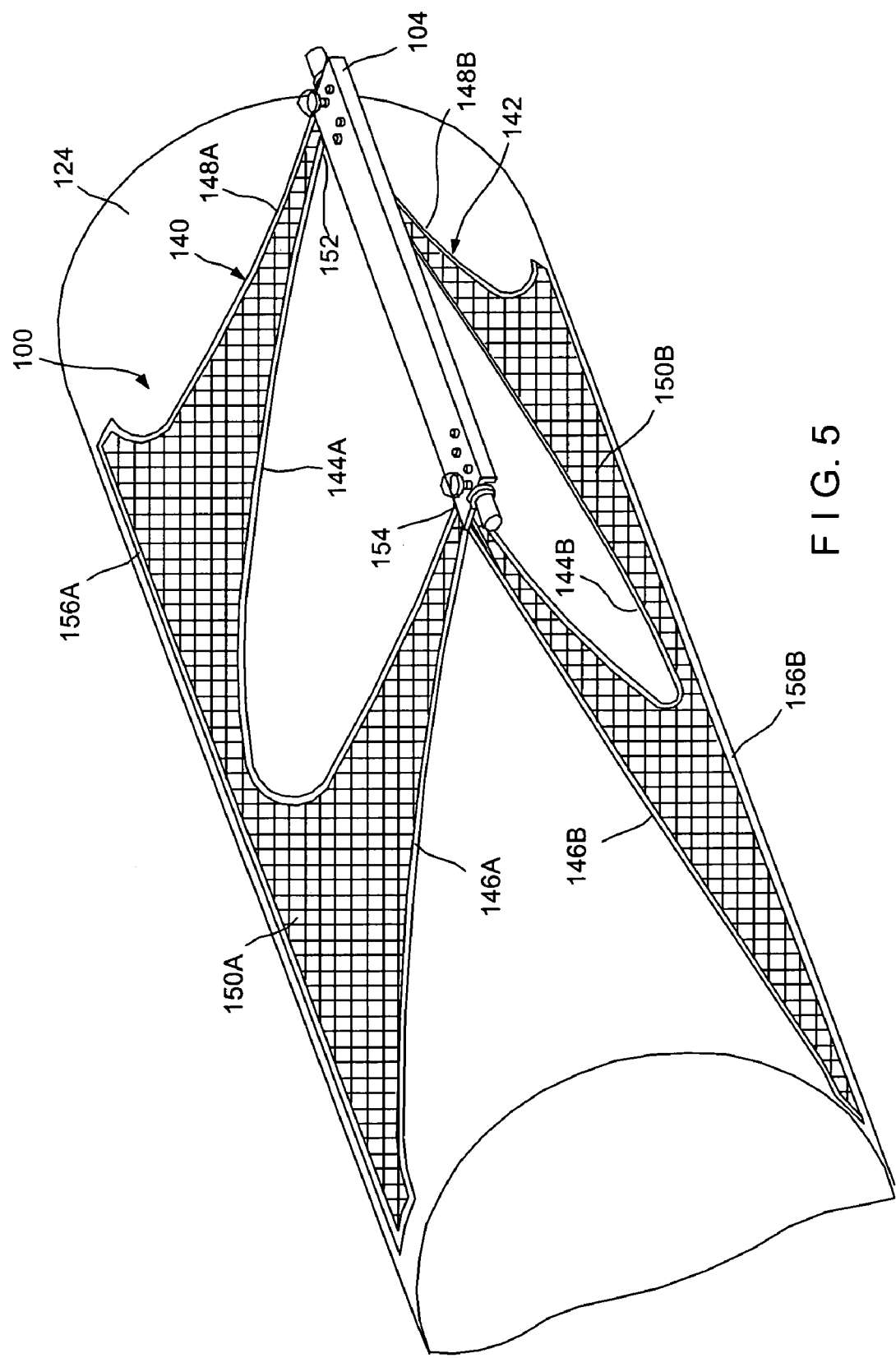
FIG. 5 is a top perspective view of the girt assembly of the invention connected at one end to an end tube of the evacuation slide and at the opposite end to a girt bar, with the details of the evacuation slide removed for clarity.
Figure 6:
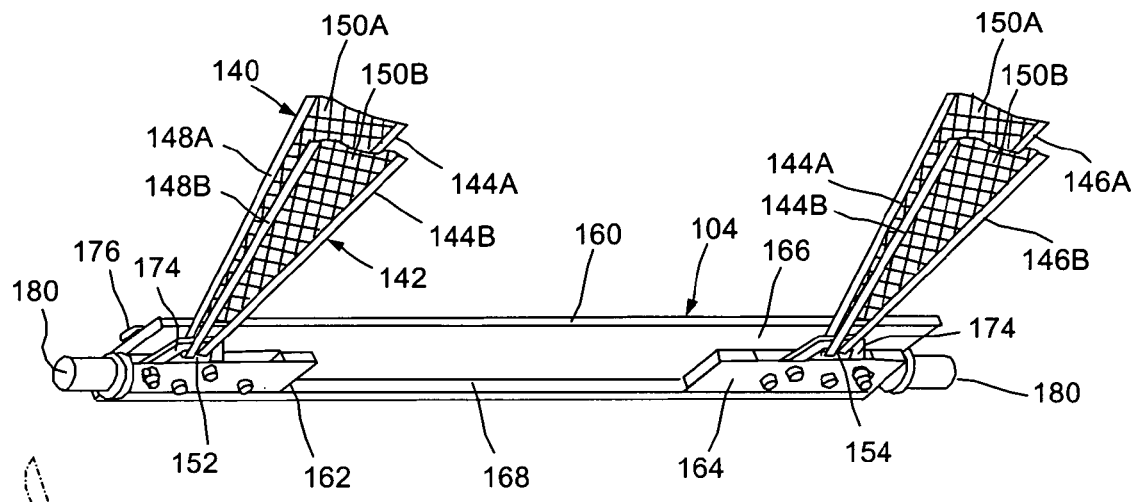
FIG. 6 is a bottom perspective view of the girt bar and girt assembly connected thereto.
Figure 7:
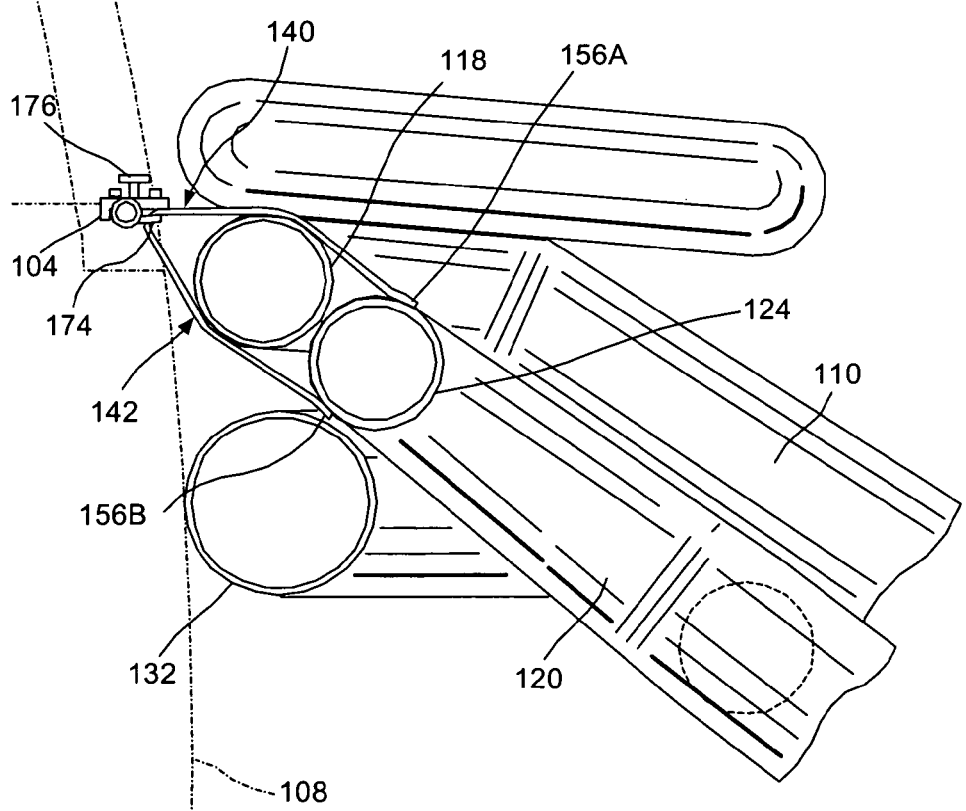
FIG. 7 is a side elevational view in partial cross section taken along line 7—7 of FIG. 4 and illustrating the manner in which the girt assembly is connected between the end tubes of the slide and the girt bar.
Figure 8:
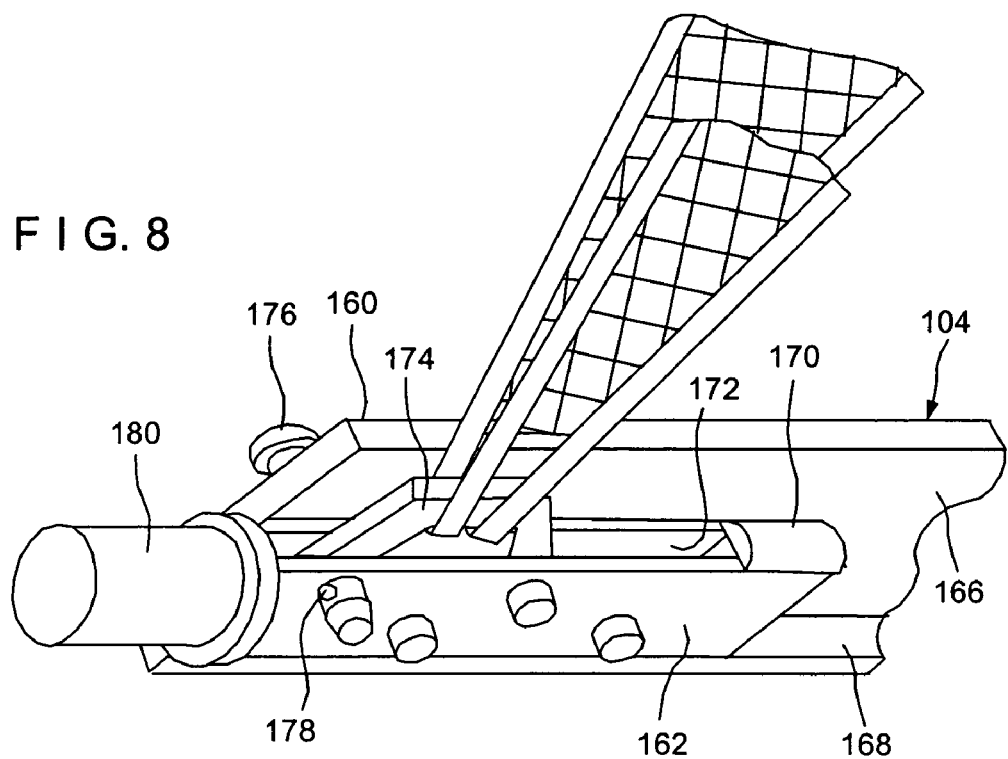
FIG. 8 is an enlarged bottom perspective view of a girt bar bracket assembly in a closed position and girt assembly connected thereto.

As shown most clearly in FIGS. 5–7, the catenary girt assembly 100 preferably includes an upper girt portion 140 and a lower girt portion 142. The upper girt portion 140 is preferably constructed of an upper catenary loop 144A, an upper first catenary loop section 146A located on one side of the loop 144A, an upper second catenary loop section 148A located on the opposite side of loop 144A, and an upper flexible panel 150A that extends between the loop 144A and loop sections 146A and 148A. The upper first and second catenary loop sections 146A and 148A preferably form half catenary loops that curve away from each other and the catenary loop 144A. Likewise, the lower girt portion 142 is preferably constructed of a lower catenary loop 144B, a lower first catenary loop section 146B located on one side of the loop 144B, a lower second catenary loop section 148B located on the opposite side of the loop 144B, and a lower flexible panel 150B that extends between the loop 144B and loop sections 146B and 148B. The lower first and second catenary loop sections 146B and 148B preferably form half catenary loops that curve away from each other and the catenary loop 144B. The catenary girt assembly 100 also includes upper and lower attachment areas 156A and 156B, respectively, that are connected to the end tube 124 of the inflatable structure. Preferably, the upper and lower attachment areas run substantially parallel to a central axis of the end tube 124 and are connected thereto through bonding, such as adhesive and/or thermal bonding. Alternatively or in addition, the attachment areas can be stitched and sealed to the end tube 124.

Although the upper and lower girt portions 140, 142 may be formed separately and joined together, they are preferably formed as a single unit and folded at connection points 152, 154 such that the upper and lower girt portions are superimposed. Accordingly, the upper and lower catenary loops 144A, 144B are preferably formed as a single, continuous strip of material. Likewise, the upper and lower first catenary loop sections 146A, 146B as well as the upper and lower second catenary loop sections 148A, 148B are each preferably formed as a single, continuous strip of material. The upper and lower flexible panels 150A, 150B are also preferably formed as a single, continuous panel. Due to the converging nature of the loops and loop sections, the connection points 152, 154 are much narrower in width than the attachment areas 156A, 156B.

The strips that form the loops 144A, 144B and loop sections 146A, 146B, 148A and 148B and the upper and lower attachment areas 156A, 156B are preferably constructed of an ultra-high molecular weight gel-spun polyethylene webbing material, such as Spectra® fiber by Honeywell. This type of material exhibits outstanding toughness and visco-elastic properties, can withstand high-load strain-rate velocities, is highly resistant to flex fatigue and compression, and is light enough to float. It will be understood that other materials can be used, such as nylon, polyester, Kevlar™ or other aramid fibers, and so on. It will be further understood that the strips can be in the form of woven or non-woven material, cords, cables, webbing, twisted cords, cables, and so on. It will be further understood that the upper and lower attachment areas can be constructed of a different material than the upper and lower loops and loop sections.

The flexible panels 150A, 150B are preferably constructed of a lightweight nylon substrate and sewn to the loops and loop sections. It will be understood that the flexible panels can additionally or alternatively be bonded to the loops and loop sections. Preferably, the flexible panels are formed of a material with greater elasticity than the strips of material that form the loops and loop sections. This stretching allows the loops 144A, 144B and loop sections 146A, 146B, 148A and 148B to assume most of the load and distribute the load evenly throughout the panels. Accordingly, the girt assembly 100 can be constructed of lighter weight fabric or material than the prior art and can be bonded to the end tube 124 with a higher load capacity. The combination of light weight material together with the absence of material on the inside of the loops 144A, 144B and loop sections 146A, 146B, 148A and 148B made the girt assembly 100 of the present invention to be considerably lighter in weight than prior art girts. Moreover, since the attachment areas 156A, 156B run substantially parallel to the tube axis, tensile loads exerted on the girt assembly result in compression of the end tube 124. This compression limits the load at the attachment areas and eliminates the peel mode of failure, i.e. the tendency of the attachment ends to peel away from the end tube.

In order to form the catenary loops, the distance between girt mounting points of the aircraft as well as the diameter of the end tube of the inflatable slide and the distance from midway between the mounting points to the end tube are taken into account. The ends of a heavy cord or chain can then be connected to the mounting points and the cord or chain is allowed to drape under gravitational forces to obtain a parabolic curve. The shape of the parabolic curve can then be transferred to the actual strip material used in the girt assembly to thereby form the shapes of the loop and loop sections. Thus, the particular curve shape, the length of the loop as well as the distance between loop ends can greatly vary, depending on the width of an aircraft escape opening or the distance between mounting points within the opening and the particular configuration of escape slide associated therewith.

Figure 12:
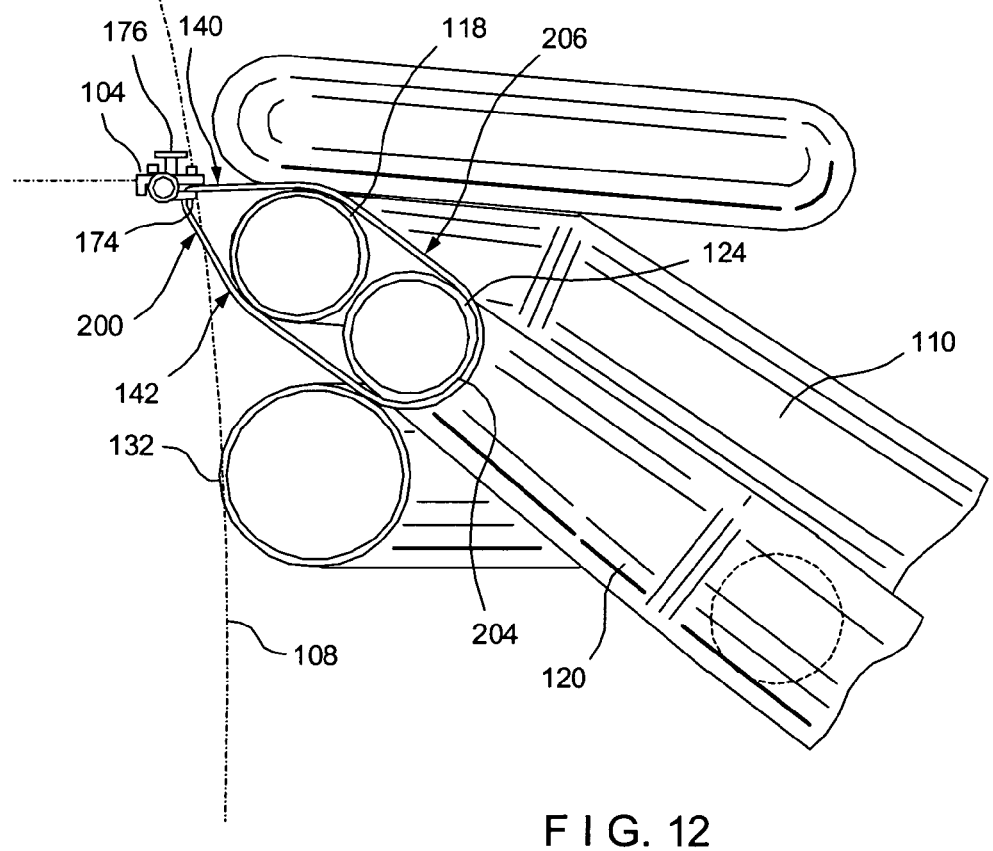
FIG. 12 is a view similar to FIG. 7 illustrating the manner in which the girt assembly is connected between the end tubes and the girt bar in accordance with the second embodiment.

Referring now to FIGS. 5, 6, 8 and 9, a girt bar 104 in accordance with the present invention is illustrated. The girt bar 104 preferably includes an elongate channel 160, a first bracket assembly 162 positioned at one end of the channel and a second bracket assembly 164 positioned at an opposite end of the channel. As shown, the channel 160 is generally L-shaped in cross section with a first leg portion 166 and a second leg portion 168 that is preferably substantially perpendicular to the first leg portion. The channel 160 is preferably formed of a lightweight material, such as extruded aluminum, although other suitable metallic and/or non-metallic materials may be used. It will be understood that the channel 160 can have other cross-sectional shapes, such as U-shaped as shown in FIG. 12, or may be formed as a hollow tubular member or solid rod or bar.

Figure 9:
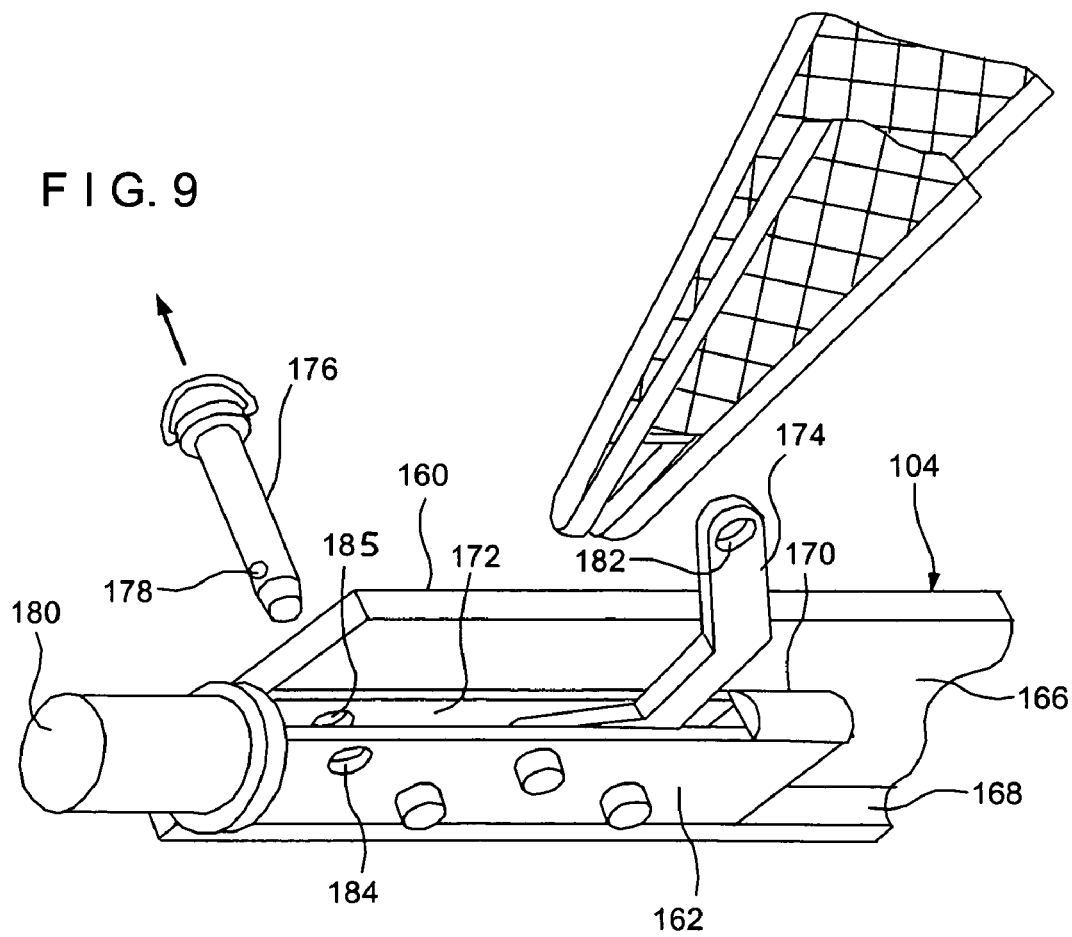
FIG. 9 is a view similar to FIG. 8 with the bracket assembly in an open position for releasing the girt assembly.

Each bracket assembly 162, 164 preferably includes a bracket housing 170 mounted to the first leg 166 adjacent the second leg 168 and a locking lever 174 pivotally mounted in a slot 172 of the housing 170. In the closed or locked position (FIG. 8), a release pin 176 with a spring-loaded ball detent 178 extends through an opening 185 (FIG. 9) in the plate 166 and housing 170, an opening 182 in the locking lever 174, and an opening 184 in the housing 170 to thereby prevent pivoting movement of the locking lever 174. The locking lever 170 can be moved to the open or unlocked position, as shown in FIG. 9, by pulling on the release pin 176 and allowing the locking lever to pivot out of the slot 172. A cylindrical rod 180 projects outwardly from each bracket assembly 162, 164 and is adapted to engage complementary structure (not shown) on the aircraft in a well-known manner to secure the girt bar 104 to the aircraft.

In use, the girt assembly 100 is initially connected to the girt bar 104 by opening the locking levers 174, looping the connection points 152, 154 of the girt assembly 100 over the locking levers, then closing the locking levers and inserting the release pins 176 through their respective locking levers to secure the levers in the closed position. Accordingly, the connection points, and thus the girt assembly 100 and evacuation slide 102, are secured to the girt bar 104 which is in turn secured to the aircraft.

During normal operation, the evacuation slide 102 is typically stored in the door or other compartment of the aircraft. When it becomes necessary to evacuate the aircraft during an emergency situation, the aircraft door is opened and the slide is inflated. For evacuation efficiency, multiple passengers and/or gear may be at various positions along the length of the slide. The combined weight of the slide, passengers and gear creates a load that is transmitted uniformly through the catenary loops 144A, 144B and loop sections 146A, 146B, 148A and 148B, resulting in desirable compressive forces acting on the end tube 124. Since the load is distributed uniformly throughout the girt assembly 100, there is no concentrated point of force that could otherwise propagate a tear in the girt and lead to catastrophic failure, as may occur in the prior art where the possibility of point loading is much greater. Even when the girt assembly 100 is overloaded, since the catenary girt ends flair out, it can only be held in place by the tension of the tube so that the end tube will collapse before the girt will tear. When the excessive load is removed from the end tube and catenary girt assembly, the end tube will return back to its original inflated position without catastrophic failure.

Equal but opposite loads are also transmitted to the locking levers 174 of the bracket assemblies 162, 164. Consequently, the girt bar 104 bears relatively little load as compared to prior art arrangements, thereby eliminating the need for the relatively heavier and more costly prior art girt bars constructed of titanium or the like that must bear the entire load. By way of example, a girt bar 104 constructed of aluminum in accordance with the present invention for a Boeing 777 aircraft should be about three pounds lighter than prior art girt bars for the same aircraft, which is a substantial savings in the aircraft industry. Accordingly, the present invention permits the use of a lighter and less costly girt bar.

In accordance with a further embodiment of the invention, since very little load is transmitted along the length of the girt bar 104, it will be understood that the girt bar 104 can be eliminated and replaced with spaced releasable connection points or brackets located directly on the floor of the aircraft adjacent the escape opening.

Figure 10:
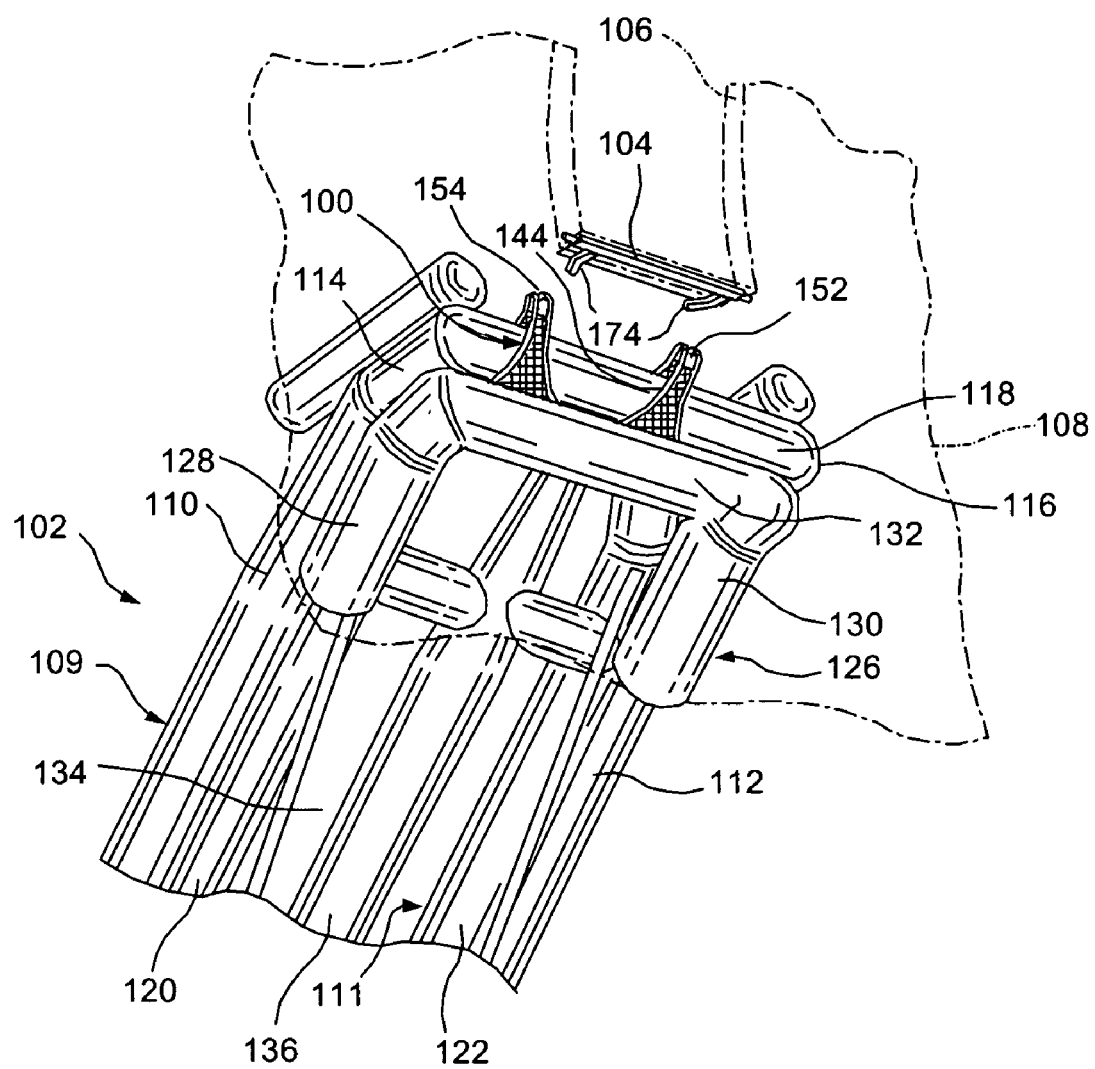
FIG. 10 is a bottom perspective view of a portion of the evacuation slide and girt assembly released from the girt bar and the fuselage of an airplane.
Figure 11:
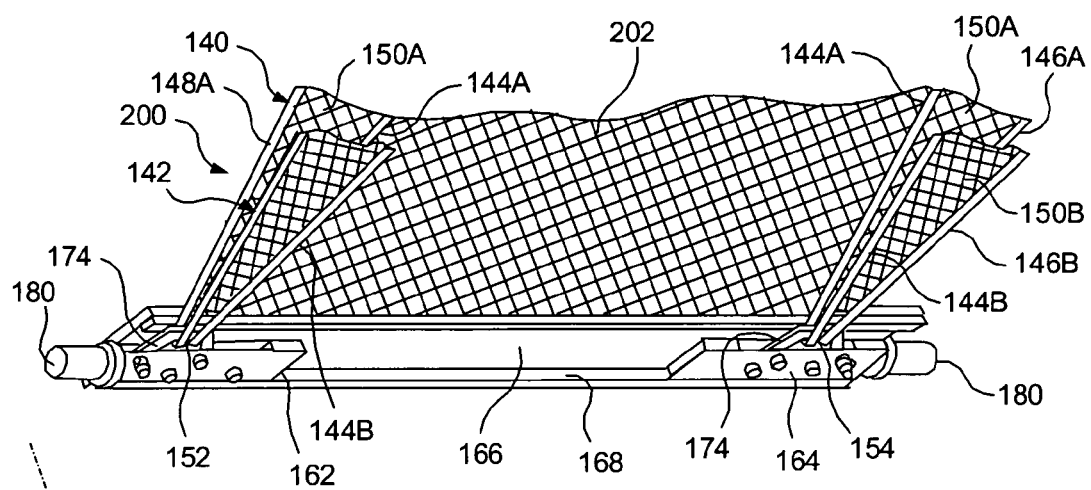
FIG. 11 is a bottom perspective view of a girt bar and girt assembly connected thereto in accordance with a second embodiment of the invention.

When it becomes necessary to release the inflated evacuation slide from the aircraft, so as to use it as a life raft during an emergency landing on water, the pins 176 are pulled to release the levers from their locked position and, due to separating forces exerted by the evacuation slide 102 caused by the weight of the evacuation slide and passengers, wind, water current, and so on, the connection points 52, 54 will tend to slip off the locking levers 174 to thereby release the evacuation slide from the aircraft, as shown in FIGS. 9 and 10. Accordingly, a quick and efficient mechanism is provided for releasing the inflated evacuation slide in the event of an emergency water landing. This is advantageous over prior art solutions that require release of the entire girt bar itself from the aircraft or a complicated two-piece girt with a series of loops and webbing arranged in a daisy chain that extends across the entire girt bar for release therefrom.

Thus, in accordance with the present invention, the provision of the girt assembly 100 and the relatively short levers 174 and release pins 176 greatly facilitates the task of separating the girt assembly 100 from the aircraft during emergency situations where ease of operation and a quick release time may be critical. Moreover, by eliminating the daisy chain arrangement of the prior art and its associated engagement and disengagement with the girt bar, less wear and tear of the girt assembly 100 will result.

Figure 13:
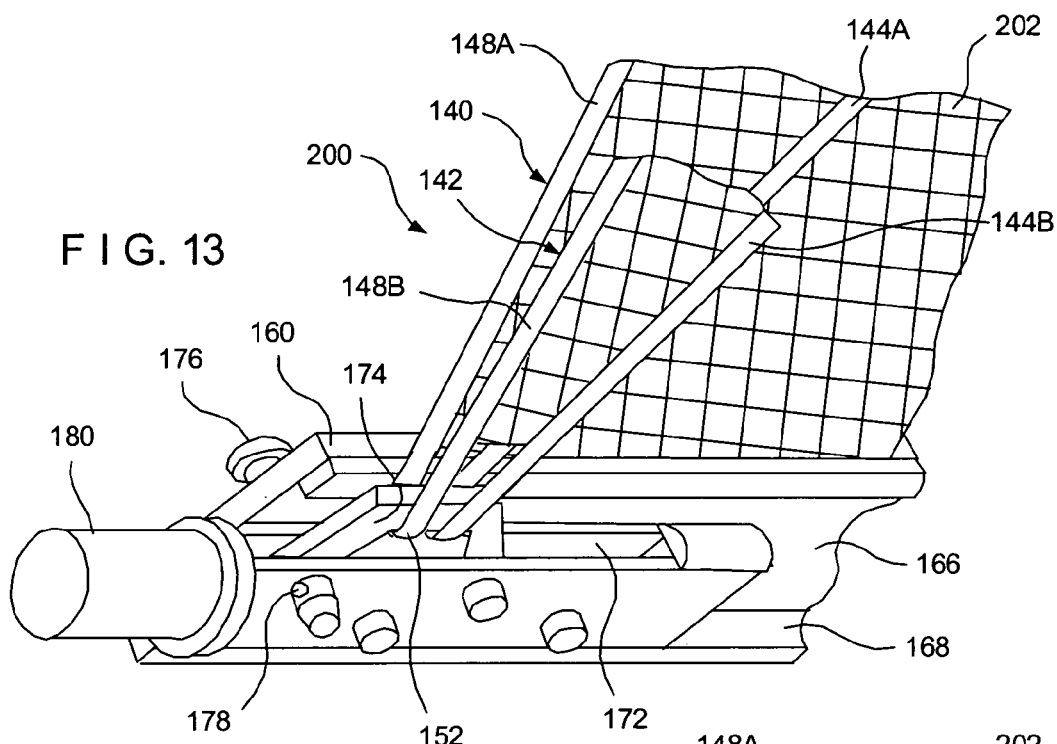
FIG. 13 is an enlarged bottom perspective view of a girt bar bracket assembly in a closed position and the second embodiment girt assembly connected thereto.
Figure 14:
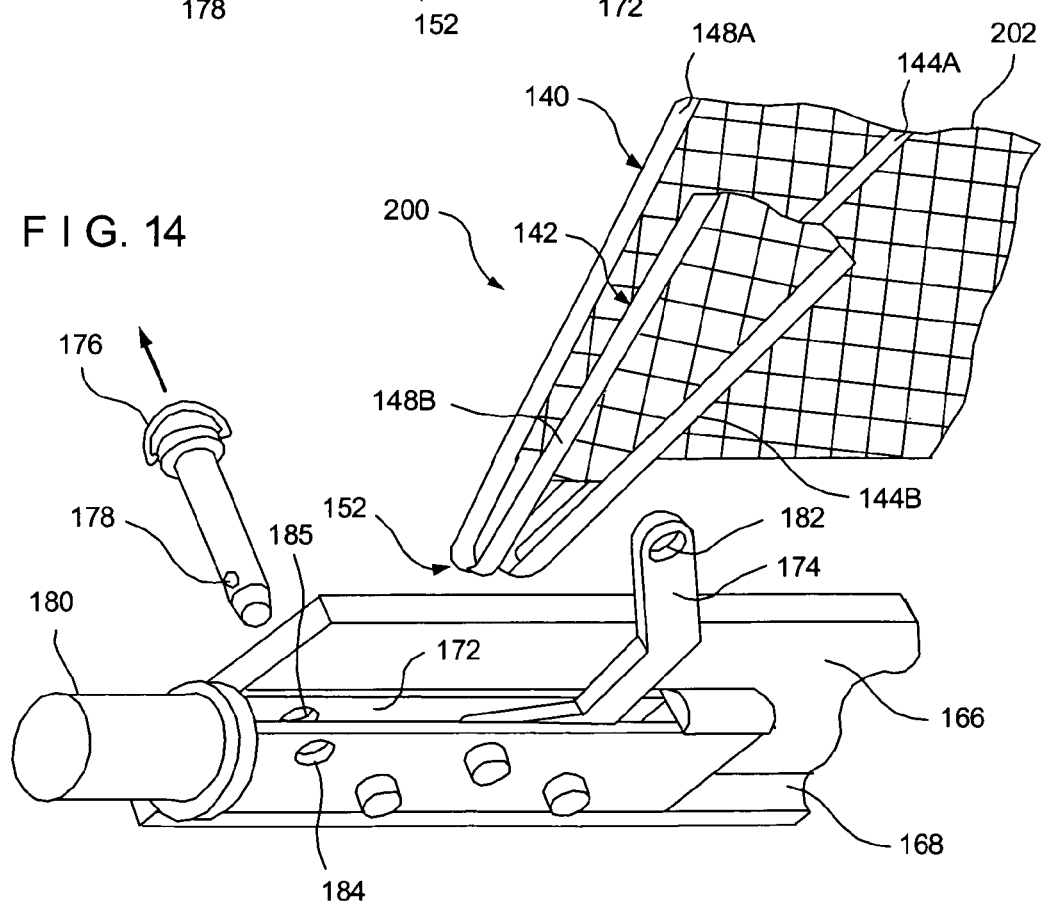
FIG. 14 is a view similar to FIG. 13 with the bracket assembly in an open position for releasing the girt assembly second embodiment.

Turning now to FIGS. 11–14, a girt assembly 200 in accordance with a further embodiment of the invention is illustrated. The girt assembly 200 is similar in construction to the girt assembly 100 previously described, with one exception being that the upper girt portion 140 is formed with a flexible panel 202 that spans the inside area of the upper catenary loop 144A. The flexible panel 202 may be constructed of the same material as the flexible panels 150A, 150B and is provided as a puncture-resistant area that blocks the open area within the upper catenary loop 144A for passenger safety during an emergency evacuation. Although the lower girt portion 142 may have a similar panel, there is no need for a lower panel since the catenary loops, loop portions and panels 150A, 150B transmit the loads. Accordingly, the material selected for the flexible panel 202 does not need to be as strong as that used in the prior art. Since the flexible panel 202 is attached to the upper girt portion 140, the panel 202 will be released with the girt assembly 200 when the locking lever 174 is in the open position, as shown in FIGS. 13 and 14.

Another difference between the girt assemblies 100 and 200 is the manner in which the girt assembly 200 is connected to the end tube 124. With the present embodiment, an attachment area 204 for connecting the girt assembly 200 to the end tube 124 is produced by forming the upper and lower girt portions 140, 142 as a continuous belt 206 and wrapping the girt assembly 200 around the end tube 124. With this arrangement, all peel modes of failure between the girt assembly 200 and the end tube 124 are eliminated as the end tube 124 is placed in compression by the girt assembly. If desired, the continuous belt 204 may additionally be bonded to the end tube 124.

It will be understood that the term "preferably" as used throughout the specification refers to one or more exemplary embodiments of the invention and therefore is not to be interpreted in any limiting sense.

In addition, terms of orientation and/or position as may be used throughout the specification, such as but not limited to: lateral, longitudinal, lower, upper, inner, outer, as well as their derivatives and equivalent terms, relate to relative rather than absolute orientations and/or positions.

It will be appreciated by those skilled in the art that changes could be made to the embodiments described above without departing from the broad inventive concept thereof. By way of example, although the loops and loop portions are preferably of catenary or hyperbolic shape, it will be understood that the loops and/or loop portions can be configured as other shapes or combinations of differently shaped curves and/or lines. It will be further understood more or less loops and/or loop portions can be used. It will be understood, therefore, that this invention is not limited to the particular embodiments disclosed, but is intended to cover modifications within the spirit and scope of the present invention as defined by the appended claims.

What is claimed is:

1. A girt assembly for releasably connecting an evacuation slide to an aircraft, the girt assembly comprising:

a first flexible panel having a pair of spaced connection points for connection with the aircraft and a first connection area spaced from the connection points for connection with the evacuation slide;

a first loop extending into the first flexible panel from the connection points;

wherein forces on the first flexible panel are distributed along a length of the first loop.

2. A girt assembly according to claim 1, wherein the first loop comprises a catenary shape.

3. A girt assembly according to claim 1, and further comprising a first loop section extending into the first flexible panel from one of the connection points and curving away from one side of the first loop.

4. A girt assembly according to claim 3, and further comprising a second loop section extending into the first flexible panel from the other of the connection points and curving away from an opposite side of the first loop.

5. A girt assembly according to claim 4, wherein the first loop comprises a catenary shape.

6. A girt assembly according to claim 5, wherein the first and second loop sections comprise a partial catenary shape.

7. A girt assembly according to claim 6, and further comprising:

a second flexible panel connected to the first flexible panel at the spaced connection points; and a second loop extending into the second flexible panel from the connection points;

wherein forces on the first and second flexible panels are distributed along a length of the first and second loops.

8. A girt assembly according to claim 7, wherein the first and second loops are continuous.

9. A girt assembly according to claim 7, and further comprising a third loop section extending into the second flexible panel from one of the connection points and curving away from one side of the second loop.

10. A girt assembly according to claim 9, and further comprising a fourth loop section extending into the second flexible panel from the other of the connection points and curving away from an opposite side of the second loop.

11. A girt assembly according to claim 10, wherein the second loop comprises a catenary shape.

12. A girt assembly according to claim 11, wherein the third and fourth loop sections comprise a partial catenary shape.

13. A girt assembly according to claim 1, and further comprising:

a second flexible panel connected to the first flexible panel at the spaced connection points; and a second loop extending into the second flexible panel from the connection points;

wherein forces on the first and second flexible panels are distributed along a length of the first and second loops.

14. A girt assembly according to claim 13 wherein the first and second flexible panels are superimposed.

15. A girt assembly according to claim 14, wherein the first and second flexible panels are continuous at the spaced connection points.

16. A girt assembly according to claim 15, wherein the second flexible panel has a second connection area spaced from the connection points for connection with the evacuation slide.

17. A girt assembly according to claim 16, wherein the first and second connection areas are separate.

18. A girt assembly according to claim 17, wherein the first and second connection areas are continuous to thereby form a continuous belt.

19. A girt assembly according to claim 15, wherein the first and second loops are continuous.

20. A girt assembly according to claim 13, and further comprising a girt bar adapted for connection to the aircraft, the girt bar having a pair of spaced bracket assemblies for releasably holding the spaced connection points.

21. A girt assembly according to claim 20, wherein each bracket assembly comprises a pivotal locking lever movable between an open position for releasing one of the connection points and a closed position for holding the one connection point, and a release pin extending through the locking lever for selectively holding the locking lever in the closed position.

22. A girt assembly according to claim 13, and further comprising a third flexible panel connected to the first flexible panel and spanning a gap created by the first loop.

23. A girt assembly according to claim 1, and further comprising a girt bar adapted for connection to the aircraft, the girt bar having a pair of spaced bracket assemblies for releasably holding the spaced connection points.

24. A girt assembly according to claim 23, wherein each bracket assembly comprises a pivotal locking lever movable between an open position for releasing one of the connection points and a closed position for holding the one connection point, and a release pin extending through the locking lever for selectively holding the locking lever in the closed position.

25. A girt assembly according to claim 1, wherein the first flexible panel has a greater elasticity than the first loop.

* * * * *